United States Patent
Guild

[11] 3,897,679
[45] Aug. 5, 1975

[54] METHOD OF CHEMICAL ANALYSIS AND APPARATUS FOR SUCH ANALYSIS

[75] Inventor: Lloyd V. Guild, Bethel Park, Pa.

[73] Assignee: Scientific Kit Corporation, Inc., Pittsburgh, Pa.

[22] Filed: July 3, 1972

[21] Appl. No.: 268,924

Related U.S. Application Data

[63] Continuation-in-part of Ser. Nos. 38,346, May 18, 1970, abandoned, and Ser. No. 117,646, Feb. 22, 1971, Pat. No. 3,754,434.

[52] U.S. Cl. ............................... 73/61.1 C; 73/23.1
[51] Int. Cl.² ........................................ G01N 31/08
[58] Field of Search....... 73/23.1, 61.1 C; 210/31 C, 210/198 C

[56] References Cited
UNITED STATES PATENTS

| | | | |
|---|---|---|---|
| 3,057,183 | 10/1962 | De Ford | 73/23.1 |
| 3,115,766 | 12/1963 | Winters | 73/23.1 |
| 3,152,470 | 10/1964 | Reinecke et al. | 73/23.1 |
| 3,168,823 | 2/1965 | Reinecke et al. | 73/23.1 |
| 3,507,147 | 4/1970 | Llewellyn | 73/23.1 |

FOREIGN PATENTS OR APPLICATIONS

| | | | |
|---|---|---|---|
| 231,203 | 11/1968 | U.S.S.R. | 73/23.1 |
| 1,193,702 | 5/1965 | Germany | 73/23.1 |
| 171,656 | 5/1965 | U.S.S.R. | 73/23.1 |
| 192,487 | 2/1967 | U.S.S.R. | 73/23.1 |

OTHER PUBLICATIONS

Boggus et al., Analytical Chemistry, Vol. 30, No. 9, Sept. 1958, pgs. 1471–1473.
Ettre, Journal of Air Pollution Control Assoc., Vol. 11, No. 1, Jan., 1961, pgs. 34–42.
Eggertsen et al., Analytical Chem., Vol. 30, No. 6, June, 1958, pgs. 1040–1043.
West et al., Analytical Chem., Vol. 30, No. 8, Aug., 1958, pgs. 1390–1397.
Novak, J., et al., *Chromatographic Method for the Concentration of Trace Impurities in the Atmosphere and Other Gases*, in Anal. Chem. 37(6): pgs. 660–666, May, 1965.

*Primary Examiner*—Richard C. Queisser
*Assistant Examiner*—Joseph W. Roskos
*Attorney, Agent, or Firm*—Hymen Diamond

[57] ABSTRACT

There is disclosed a method, particularly useful in studying pollution, for concentrating components, under investigation, of a fluid, in a concentrator including a tube having in it a selective adsorbent for the components, such as a molecular sieve or diatomaceous earth impregnated with silicone oil. A measured relatively large quantity of the fluid is transmitted through the tube and the components in the fluid are adsorbed. The adsorbent is then heated rapidly to a predetermined temperature at which the component is desorbed and passed through measuring apparatus such as a chromatograph or analyzed in a spectrophotometer. As the fluid passes through the concentrator the component is deposited progressively along the length of the adsorbent from the fluid input end of the concentrator to its output end. The quantity of the adsorbent in the concentrator is so set that a readily measurable quantity of component can be deposited from the fluid along less than the whole length of the adsorbent. The method is particularly useful where the component sought is of such low concentration in the fluid that the quantity of component in a moderate quantity of fluid is below the detecting limit of the measuring instrument. Since there is substantially no component in any of the fluid emitted from the output end of the concentrator, the concentration of the component in the fluid can be determined from the indication of the measuring instrument and the known quantity of the fluid transmitted through the concentrator.

There is also disclosed a novel concentrator and apparatus in which the adsorbent is heated by passing high current through the tube so that the adsorbent is rapidly heated to the predetermined temperature. The current may be automatically turned off when this temperature is reached.

16 Claims, 12 Drawing Figures

METHOD OF CHEMICAL ANALYSIS AND APPARATUS FOR SUCH ANALYSIS

REFERENCE TO RELATED APPLICATIONS

This application is a continuation-in-part of an application Ser. No. 38,346 filed May 18, 1970 to Lloyd V. Guild for Method Of Chemical Analysis And Apparatus For Such Analysis and assigned to Scientific Kit Corporation and now abandoned.

This application is also a continuation-in-part of Ser. No. 117,646 filed Feb. 22, 1971 and now U.S. Pat. No. 3,754,434 granted Aug. 28, 1973 to Lloyd V. Guild for Chemical Analysis and assigned to Scientific Kit Corporation.

BACKGROUND OF THE INVENTION

This invention relates to the art of chemical analyses and has particular relationship to the quantitative analysis of fluids for components whose concentration in the fluid is relatively small. While this invention has general use in all applicable fields and activities where analysis is demanded, it is particularly useful in pollution control where it is necessary to determine the concentration of very small quantities of a pollutant in air or water.

Quantitative analysis of fluids typically may be carried out with a chromatograph or a spectrophotometer. Briefly, a chromatograph is a column of a material which transmits different components of a fluid supplied to its input at different time rates so that the components pass out of its output at different times as pulses. By measuring the area of a record of the pulse, either with a computer or from a chromatogram, the quantity of the component of the fluid in the pulse may be measured. In a spectrophotometer different components produce different absorption of light of selected wavelengths. The quantity of a component can be determined by the intensity of the resulting light passed through the specimen by Beer's Law.

Typically, a chromatograph can operate with, or handle, a relatively small quantity, of the order of 1 milliliter (1 ccm) of fluid. A spectrophotometer depends for its operation on absorption of light and this requires at least predetermined concentration of a component in a liquid. Where the concentration of the component sought in a fluid is very small, difficulty has been experienced in measuring the concentration because it is below the limit of sensitivity of the measuring apparatus. For example, a chromatograph typically may be capable of detecting and measuring one part in one million of a component in a fluid. Where the component concentration is one part in one hundred million, the component is not detectable or determinable by prior-art methods and apparatus.

Typical of the attempts, in accordance with the teachings of the prior art, to meet this difficulty is the article by Novak, Vasak and Janak in Analytical Chemistry, Vol. 37, No. 6, May 1965, pages 660–666. This method has proved unreliable and not precise and its practice is complicated and costly.

It is an object of this invention to overcome the above-described disadvantages of the prior art and to provide a reliable and precise method, which can be readily and simply practiced, for detecting and measuring the concentration of components in a fluid where this concentration is very small, particularly below the sensitivity limits of the measuring instrument. It is also an object of this invention to provide apparatus for practicing this method. An ancillary object of this invention is to improve the sensitivity, reliability and precision of measurement of concentration of trace components in a fluid even in cases where the concentration of components is inadequate to meet the limiting sensitivity of the measuring apparatus without complicating the practice or the apparatus serving this purpose.

SUMMARY OF THE INVENTION

In the practice of this invention a concentrator is provided which includes an adsorbent through which the fluid, typically a gas, containing the components under observation is passed. Typically the components may be xylenes in air. The adsorbent may then be diatomaceous earth impregnated with silicone oils. A known volume of air is, in the practice of this invention, passed through the adsorbent and is adsorbed progressively along the length of the adsorbent between the input end and the output end of the concentrator.

The adsorption is a phase-equilibrium phenomenon. Along each element of the adsorbent there is a dynamic interchange of molecules between the adsorbed phase of a component and the vapor phase over the adsorbed phase. Collisions between the molecules tend to return some of the molecules in the vapor phase to the adsorbed phase; others escape. Molecules from the adsorbed phase are ejected into the vapor phase and take part in these collisions. Initially the vapor phase is of low concentration and more molecules enter the adsorbed phase than are returned to the gas phase but ultimately the vapor phase reaches a steady-state condition at which as many molecules are returned as are ejected. At this point there is phase equilibrium and the element of the adsorbent may be regarded as saturated with a component. The quantity of a component which can be adsorbed in an adsorbent is an exponential decreasing function of temperature and is thus highly temperature sensitive. Much greater quantities of components can be adsorbed at low temperatures, for example, the temperatures of dry ice or liquid nitrogen than at higher temperatures.

The Novak practice is to pass the fluid containing the components through the sampling tube until the adsorbent is saturated. The content of the sampling tube is then passed through a chromatograph and the component content computed from the measurement of the chromatograph, the temperature of adsorption in the sample, the equilibrium constant, the partition coefficient and other properties or parameters.

This invention arises from the realization that the Novak practice is unreliable because the state of saturation of the adsorbent for any component is not readily and precisely determinable. The determination depends on detection of the component in the fluid emitted from the sampling tube and the component is not readily detectable because its content in the fluid is very small. Precision is also deleteriously affected by difficulty of determining the precise temperature at which the components are adsorbed. Since the adsorption depends exponentially on temperature, a small error in temperature may result in a large error in the quantity of a component adsorbed. Additional complexities are introduced when there are several components in a fluid that interact with each other in setting the phase equilibrium.

In accordance with this invention the quantity of the adsorbent in the concentrator is such that an adequate quantity of a component to produce a measurable indication is adsorbed in less than the whole length of the adsorbent. The quantity of the component adsorbed is then absolute and not relative and is readily and simply determined from the measurement derived from the chromatograph or other instrument and the known volume of fluid passed through the chromatograph. Where the content of component in the fluid is very small the volume of adsorbent may be large; the tube containing the adsorbent is of larger diameter and the length of the adsorbent is longer. The adsorption of a component in an absorbent may also be increased by adsorbing at a low temperature. For this purpose the concentrator may be packed in dry ice or liquid nitrogen or the like.

The concentrated components are retained in the adsorbent concentrator so long as the temperature of the concentrator, that is of the adsorbent, is below a predetermined temperature; the concentrator is heated to pass the component through the measuring apparatus. For example, where a concentration of one-hundreth of the sensitivity of the measuring apparatus is anticipated, the component in a hundred or a thousand times the volume of the fluid which would normally be used is concentrated. Example: Assume that the concentration of the component in the fluid is one part in one hundred million. By passing 10 liters of the fluid through the concentrator, 0.01 milliliter is concentrated. This quantity can readily be handled by the measuring apparatus even if diluted in a carrier gas. Usually this concentration of component is not demanded.

Typically, in the case of the xylenes, the concentrator tube is stainless steel and is U-shaped, each arm of the U being 3 inches long. The outside diameter of the tube is 3/16 inch and the wall thickness 0.010 inch. The impregnated diatomaceous earth is packed in the tube over a length of 4½ inches. The xylenes are adsorbed at room temperature from a fluid sample of 0.1 liter. The concentrator on being connected to the measuring instrument, a chromatograph, is heated to about 200°C. to inject the component adsorbed into the chromatograph. The chromatograph is maintained at about 150°C. to 175°C. By use of 0.1 liter of fluid the quantity of xylenes in the adsorbent is 100 times the quantity in 1 milliliter of fluid. A sensitivity of one part in $10^6$ ($10^{-6}$) is converted into a sensitivity of one part in $10^8$ ($10^{-8}$).

The concentration is, in the practice of this invention, effected in several different ways by adsorbents of different types:

1. By passing the fluid through an adsorbent which adsorbs the components sought most heavily; that is, at a far higher rate than the remainder of the fluid containing the sought components. The adsorbent also retains the adsorbed component so long as it is maintained below a predetermined temperature and desorbs the component when it is raised at least to this predetermined temperature. In this case the concentrator includes a tube which contains the solid adsorbent or partition-type packing. A solid adsorbent is typified by charcoal; a typical partition-type packing is, as indicated above, diatomaceous earth (or other inert material) impregnated with a high boiling point liquid such as silicone oil. The component is trapped in the surface impregnant on the inert material. To aid in the trapping of certain materials the impregnant may be an electrically polarized material. Concentrators of this type serve in the measurement traces of $O_2$ in $H_2$, hydrocarbons and solvents in air, $CO_2$ in $N_2$, most impurities in helium.

2. By passing the fluid through a molecular sieve which adsorbs the component under investigation by reliance on differences in diameter of the molecules of the component and of the remainder of the fluid. Such sieves are typically synthetic zeolite sold by Union Carbide Corporation with different pore diameters. Typically, pore diameters of 3, 4, 5 and 13 angstroms are available. The sieve material is particled. The molecules of components having molecule diameters smaller than the pore diameters are trapped within the molecular lattice of the individual particles; the remainder of the fluid which has molecules of larger diameter than the pore diameters passes through the sieves. Typically, molecular sieves may serve to concentrate, for quantitative determination, trace quantities of normal butane in isobutane, propylene in propane, ethane in propane, hydrocarbons in aromatics, water in alcohol and the like.

3. By non-reversible chemical reactions. For example, to determine the trace amounts of oxygen and nitrogen in $CO_2$, the appropriate large volume of $CO_2$ can be reacted with sodium hydroxide to produce solid $Na_2CO_3$ and the quantity of $O_2$ and $N_2$ which remains as a gas can then be determined.

4. By reversible chemical reactions. The components under investigation may be trapped by chemical reaction at a lower temperature and released at a higher temperature. The components under observation may also be released chemically or by changing the pH factor of a solution.

In the practice of this invention concentrators after adsorbing components are successively connected in a gas-flow circuit with the measuring instrument and desorbed by heating. The desorbed component is transmitted through the instrument by a carrier gas.

An aspect of this invention arises from the realization that the adsorbent does not adsorb the component under observation symmetrically; the component is adsorbed for a distance along the adsorbent from the input end of the concentrator. In accordance with this invention the concentrator is so structured as to assure that the concentrator is connected into the gas-flow circuit with the input end remote from the instrument.

Another aspect of this invention arises from the realization that the desorbing temperature must be precisely controlled. In the practice of this invention current is conducted through the concentrator tube to heat the tube and its adsorbent to the desorbing temperature. The temperature may be measured by a thermocouple welded or soldered to the concentrator tube. However, where this tube is carried into the field during the sampling this presents difficulties. To overcome this difficulty an auxiliary tube having the same resistivity as the concentrator tube is connected into the heating circuit to conduct the same current as the concentrator tube and the thermocouple is soldered or welded to this auxiliary tube or a resistance thermometer is inserted in the tube.

In the practice of this invention the measuring instrument is heated, typically in a furnace, prior to, and during, measurement. An aspect of this invention is the provision of means for effectively transmitting the heat from the furnace to the exit end of the concentrator to suppress any loss of adsorbent by vaporization and condensation on walls as it passes into the instrument.

It is desirable that the flow of carrier gas shall not be interrupted during the transition when a concentrator which has been desorbed is replaced by another concentrator. In accordance with another aspect of this invention a shunt is provided in the carrier flow circuit which maintains the carrier gas flow during this transition.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 4 is a fragmental view in section taken along line IV—IV of FIG. 1;

DETAILED DESCRIPTION OF INVENTION

Figure 1:
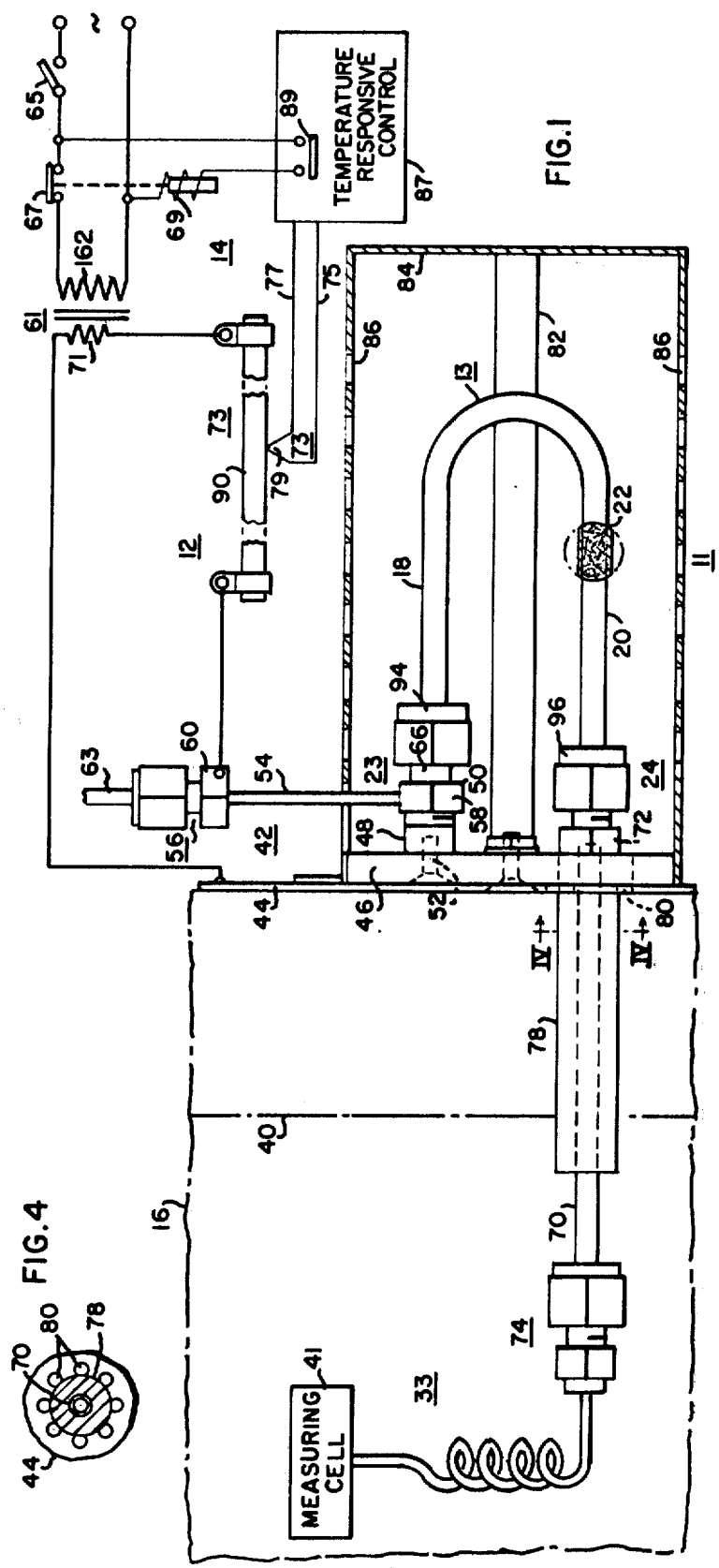
FIG. 1 is a view partly in side elevation and partly schematic of an embodiment of this invention with which the method according to this invention is practiced.

The apparatus shown in FIG. 1 includes a concentrator 11, a measuring instrument in the form of a chromatograph column 33, and a furnace 16 for heating the chromatograph column 33. There is also a heating unit 12 for the concentrator and a temperature-control unit 14 for the heating unit.

The concentrator 11 includes a tube 13 of U-shape or hairpin or trap shape. The arms 18 and 20 of the tube 13 are of unequal length; typically the input arm 18 is shorter than the output arm 20. Within the tube 13 there is packing 22 of adsorbing material as disclosed above. At its ends the tube 13 carries fittings 23 and 24. These fittings 23 and 24 are gas-tight; typically they are SWAGELOK fittings.

To prevent end cooling and premature end heating of the adsorbent, the adsorbent 22 is packed spaced from the ends of the arms 18 and 20. At each end glass wool 26 (FIG. 2) is inserted. Typically the adsorbent is spaced about 20 to 25 millimeters from the ends. The concentrator 13 may be packed in dry ice or liquid nitrogen which is represented by the rectangle 120.

The concentrator 11 is removable from the apparatus shown in FIG. 1. In the practice of this invention concentrators 11 are successively connected to the apparatus shown in FIG. 1 and the components adsorbed by them are desorbed, separated by chromatographic column 33, and measured by the measuring cell 41. After completion of the measurement each concentrator is treated out, closed by caps (not shown) and returned to adsorb components. Following adsorption a concentrator 11 is closed by the caps and returned for measurement.

In the adsorption of the components the fluid containing the components is typically injected into the short arm 18 and emitted from the long arm 20. Opposite flow is also feasible but must be coordinated with the apparatus shown in FIG. 1. The quantity of adsorbing material is such that an adequate quantity of components is adsorbed in only a portion M (FIG. 2) of the length of the adsorption medium 22 between the input end and the output end to produce a readily measurable indication on the measuring cell 41. Because the arms 18 and 20 are of different length, the concentrator 11 can only be connected into the apparatus shown in FIG. 1 with its arms in a preselected orientation.

The column 33 is heated in the furnace 16 having an insulating wall 40. On the outer surface of wall 40 a mounting 42 for the concentrator 11 is provided. This mounting 42 includes a plate 44 of conducting material, such as stainless steel secured to the wall 40. Secured to the plate 44 is a plate 46 of electrically and thermally insulating material. A stud 48 is secured to the insulating plate 44 by a screw 52 which is countersunk in the plate 46 so that it is insulated from the plate 44. The female part 50 of the fitting 23 is secured to the stud 48. A tube 54 penetrates through the nut 58 of the female part 50 and communicates with the tube 66 of part 50 and through it with the tube 13. The tube 54 carries a fitting 56 (typically SWAGELOK) at its outer end and the nut 60 of the female part of this fitting 56 is secured to tube 54. Carrier gas is supplied through the tube 54 from a source such as a tank (not shown) of helium or the like through a conductor or tube 63 of TEFLON (Polytetrafluoroethylene) which is connected to tube 54 through the fitting 56.

A tube 70 typically of stainless steel extends from the column 33 through the wall 40 and into the female part 72 of fitting 24, thus communicating with tube 13. The tube 70 carries a fitting (SWAGELOK) 74 at its end and this fitting connects to column 33. Slideably mounted on tube 70 is a sleeve 78 of thermally conducting material such as aluminum. The sleeve 78 conducts heat from the furnace 16 to heat the tube 70 and effluent which it conducts to the column 33. The sleeve 78 abuts the plate 44. Although the plate 44 is composed of stainless steel which has relatively low thermal conductivity, it is desirable to suppress flow of heat from sleeve 78 along the plate. The plate 44 has perforations 80 (FIG. 4) where it is abutted by the sleeve 78 and the heat conducted by sleeve 78 is confined to the tube 70 and the end of arm 20.

The stud 48 is dimensioned in length appropriately so that the short arm 18 and the long arm 20 of tube 13 are securely connected to, and suspended from, insulator 46 and the seals formed by fittings 23 and 24 are effective.

Typically the concentrator 11 is centered substantially on a diameter of the insulator 46. A rod 82 is suspended from the insulator 46 along a diameter substantially at right angles to the diameter on which the concentrator 11 is centered and to one side of the concentrator. A cylindrical housing 84 is secured to the end of rod 82. The housing 84 shields the concentrator 11 from drafts. To prevent the formation of a dead air space, holes 86 are provided at diametral positions of the housing to permit even air flow.

The heating of the concentrator 11 is effected electrically by conducting current through the tube 13. For this purpose the heating unit 12 includes a step-down transformer 61. The primary 162 of this transformer is connected through a switch 65 and the back contact 67 of a relay 69 to a single-phase commercial supply. The secondary 71 is connected at its "hot" terminal to the nut 60 of fitting 56 through a tube 90 having the same resistance per unit length as the tube 13. Typically the tube 90 is composed of the same material as tube 13 and has the same thickness and inside diameter. At its other terminal secondary 71 is grounded to plate 44. A series electrical circuit is thus formed whose power supply is secondary 71 and which includes tube 90, tube 54, tube 13, and plate 44. Transformer 61 being a step-down transformer, it supplies substantial current to heat tubes 13 and 90. Since the resistivity of these tubes is the same, both are raised to the same temperature and the temperature measuring element may be connected to tube 90 rather than tube 13 which is removed for obtaining samples.

Typically, the primary 162 conducts about 3⅓ amperes and the secondary about 150 to 200 amperes. The tube 13 and the adsorbent 22 in the tube 13 are effectively heated to the desorption temperature by the current flow through the tube 13. Packing such as 22 may be included in tube 90.

Figure 6:
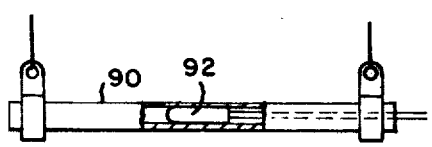
FIG. 6 is a fragmental view in section showing a modification of this invention.
Figure 5:
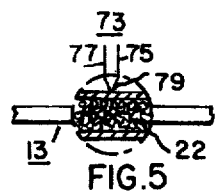
FIG. 5 is a fragmental view partly diagrammatic and partly in section showing one of the alternative means of measuring the temperature of the adsorbent during desorbing in the practice of this invention.
Figure 7:
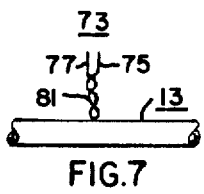
FIGS. 7 and 8 are fragmental views in side elevation showing improper connection of a temperature-measuring thermocouple to a concentrator or a tube in circuit with the concentrator.
Figure 8:
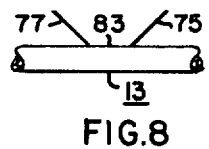

The temperature control unit 14 includes a thermocouple 73 whose wires 75 and 77 are welded or soldered to the tube 90 in a sharp V 79 which forms the hot junction of the couple 73. This connection is desirable for effective transfer of heat to the hot junction 79. If the wires are twisted as shown in FIG. 7, the heat travels along the twisted wires 81 and the response and the effectiveness, as a temperature indicator of the couple 73, is reduced. A connection as shown in FIG. 8 superimposes alternating current potential in the gap 83 on the small potential output of the couple 73. Alternatively the thermocouple may be connected to the tube 13 as shown in FIG. 5. The temperature-control unit 14 shown in FIG. 1 has the advantage that other temperature measurement devices than thermocouples can be used. For example, a resistance thermometer 92 may be inserted in tube 90 as shown in FIG. 6.

The temperature-control unit 14 also includes a temperature-responsive control 87 which may be of any suitable type. Typically, such a control 87 includes a contact 89 which is closed when the desorption temperature is reached to energize relay 69 and open the heating circuit. This control is required to assure that the component or components under observation are predominately desorbed and that other components which might confuse and complicate the determination are not desorbed. The relay 69 or contact 89 may be latched or locked in. Typically, the latch or lock-in may be connected so that switch 65 must be reset to reset relay 69.

Figure 2:
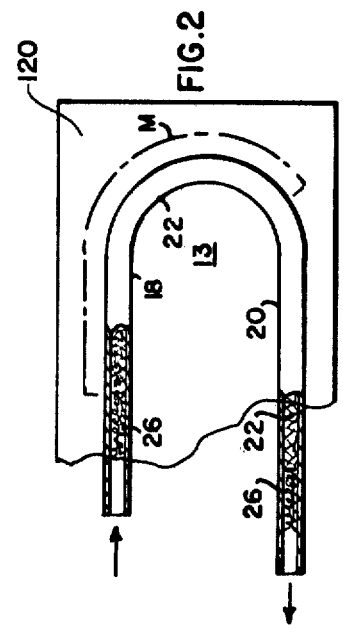
FIG. 2 is a fragmental view in section showing the manner in which components are adsorbed from a fluid in the practice of this invention.

In the practice of this invention with the system shown in FIG. 1, the concentrator 11 is filled with a packing 22 selected according to the particular component of a fluid to be concentrated as shown in FIG. 2. The concentrator 11 is then connected in the system and carrier gas admitted through tube 54 to flush out concentrator 11. The temperature of concentrator 11 is raised by closing switch 65 to drive off all adsorbed compounds if any. Concentrator 11 is then removed by disconnecting at fittings 23 and 24. The nuts 94 and 96 of the fittings are removed with the concentrators. After removal the concentrator is capped.

A measured amount of sample fluid is now either pulled or pushed through concentrator 11 to concentrate the desired components. The components are adsorbed, as shown in FIG. 2, over a portion of the length M from the short arm 18. The concentrator is then capped and returned to the apparatus shown in FIG. 1 and is connected onto the apparatus shown in FIG. 1 with the short arm remote from the column 33. Carrier gas such as helium is supplied through tube 54. The temperature of the adsorbent 15 is then rapidly raised by closing switch 65 to drive the concentrated component or components into column 33 for analysis. The heating takes place while the carrier gas is flowing through tube 54.

Typically, the desired desorption temperature is reached after about ten seconds of heating. At this point relay 69 is energized and the heating circuit is opened. The components under observation then pass through column 33 as a series of pulses. The electrical connections of the secondary 71 to the concentrator 11 must be firm and of very low resistance. If necessary the concentrator 11 may be enclosed in a cooling medium (not shown). In the usual practice of this invention a number of concentrators are used and then analyzed in the apparatus in succession.

Figure 3:
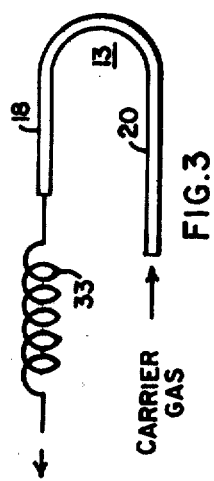
FIG. 3 is a fragmental diagrammatic view used in explaining an aspect of this invention.

The carrier gas sweeps out the vapor phase of the adsorbed components. The phase equilibrium is then destroyed and the adsorbed phase is vaporized and is carried into the column 33 by the carrier gas. The appropriate directional connection of the concentrator 11 is essential. If the concentrator 11 were connected as shown in FIG. 3 with the carrier gas flowing into the long arm, where there may be no adsorption of components, all or a portion of the adsorbed specimen may be lost while the concentrator is being connected and the resolution is deteriorated because partial separation has already occurred. The possibility of loss of the specimen is most important. In the usual practice of this invention, when a concentrator with adsorbed components is connected to a chromatograph, it is flushed out for a few minutes with carrier gas to stabilize conditions. Since the adsorbed components are at the chromatograph end of the concentrator 11 they will be flushed into the chromatograph column before heating. Appropriate directional connection is achieved as shown in FIG. 1 with a concentrator tube 13 having a short arm 18 and a longer arm 20.

Figure 9:
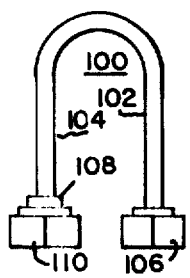
FIG. 9 is a fragmental view in side elevation showing a modification of this invention.

An alternative structure is shown in FIG. 9 for assuring fool-proof connection of the concentrator into the apparatus shown in FIG. 1. In this case the concentrator includes a tube 100 whose arms 102 and 104 are of equal length. There is a male part 106 of a fitting typically of 3/16 inch, directly on arm 102. Arm 104 has a sleeve 108 and a male part 110 of a fitting, typically of ¼ inch on the sleeve 108. The corresponding female parts of the fittings are provided on insulator 46 (FIG. 1) and on tube 70. Typically the tube 100 is supplied with the fluid so that the components are adsorbed from the end of fitting 106. The female parts of the fittings permit connection only with the fitting 106 remote from the column 33.

Figure 10:
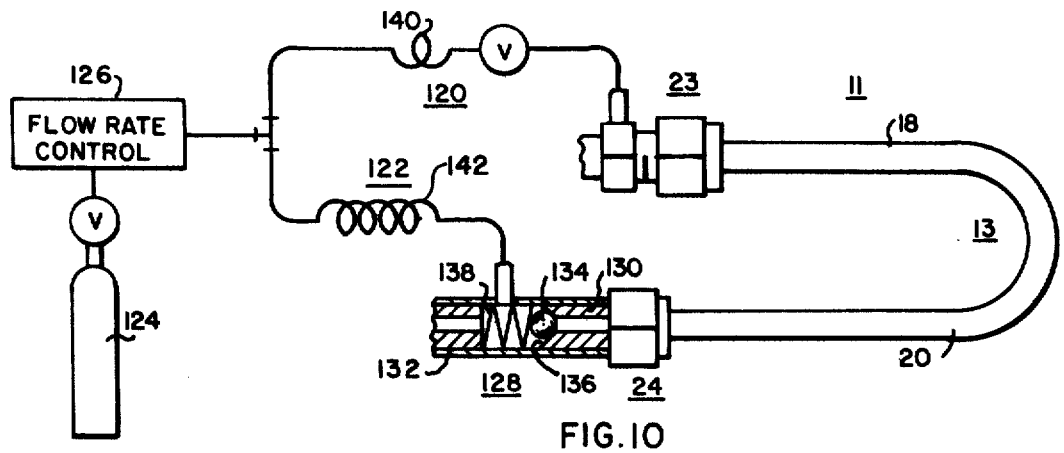
FIG. 10 is a fragmental view partly in section, partly in side elevation, and partly diagrammatic, showing a modification of this invention in which the flow of carrier gas is maintained during the hiatus when concentrators are disconnected from the measuring instrument.
Figure 11:
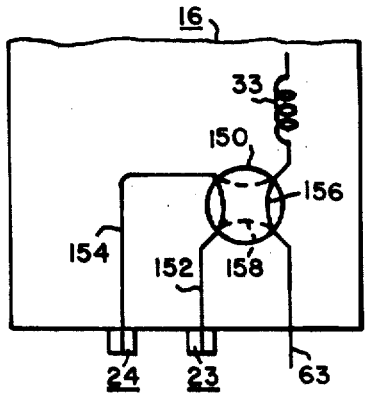
FIG. 11 is a fragmental diagrammatic view showing a modification of the apparatus shown in FIG. 10.

The apparatus shown in FIG. 1 would require interruption of the carrier gas during the interval when a concentrator 11 is being replaced by another concentrator. This interruption may be undesirable. FIGS. 10 and 11 show apparatus in which the carrier gas is shunted through the column 33 during the hiatus.

The apparatus shown in FIG. 10 includes gas-flow circuits 120 and 122 supplied from the carrier gas tank 124 through a flow rate control 126. Circuit 120 includes a capillary coil 140 of low impedance and is connected to the column 33 through the concentrator 11 and check valve 128. Check valve 128 is interposed in the tube 130 connected to the column 33; tube 130 is encircled by sleeve 132. Valve 128 includes a ball 134 urged into engagement with seat 136 by spring 138. When the concentrator 11 is connected in the circuit, the check valve 128 is opened, and the carrier gas carries the components in concentrator 11 into the column 33. The shunt circuit 122 has a capillary coil 142 of high impedance and is connected to tube 130 beyond the check valve 128. Typically there may be a pressure drop of four or five pounds across coil 140 and of 40 or 50 pounds across coil 142.

When valve 128 is open, most of the gas, typically 90 percent, from the tank 124 flows through the concentrator 11 to the chromatograph and only a small residual quantity, typically 10 percent, flows directly to the column 33. When the concentrator 11 is disconnected from the apparatus the carrier-gas flow through circuit 120 is blocked by valve 128 and the carrier gas flows directly to the column 33 through tube 130.

An alternative apparatus, shown in FIG. 11, includes a solenoid-controlled or manually controllable valve 150 in the oven in circuit with tubes 152 and 154 connected respectively to fittings 23 (nut 58) and 24 (nut 72). In the full line 156 position of the valve 150 the carrier gas flows directly through column 33. In this position the concentrator 11 is disconnected from the apparatus. When the concentrator 11 is connected into the apparatus the valve is set in the broken line 158 position and the carrier gas flows through the concentrator 11 and then through the column 33. The valve must be capable of withstanding the temperature of the oven (200°C. or higher). The valve 150 may be actuated responsive to the presence or absence of concentrator 11 in the apparatus.

Figure 12:
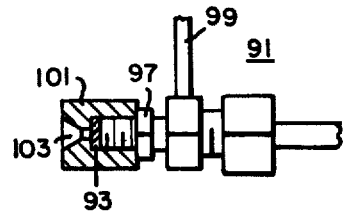
FIG. 12 is a fragmental view partly in section and partly in side elevation showing a further modification of this invention.

FIG. 12 is a system including a concentrator 91 in which the sample of fluid is injected through a septum 93 with the concentrator 91 connected in the system. In this case a tube 97 with a side arm 99 is screwed onto the thread at the input end of concentrator 91. The septum 93 is rubber-like and is held against the end of tube 97 by a cap 101. The carrier gas is supplied through arm 99 and tube 97. The fluid may be inserted by injecting a hypodermic needle through opening 103 and through septum 93. The sample fluid is carried into concentrator 91 by carrier entering through arm 99. A succession of samples may be analyzed by inserting successive septums 93 under cap 101. Prior to each analysis the concentrator 91 should be prepared by flushing through 99 and heating. Where the component in a fluid which is dissolved in a liquid solvent and the concentrator adsorbs the component with the solvent, the solvent is desorbed from the concentrator at a temperature lower than the predetermined temperature at which the component is desorbed and higher than the adsorbing temperature.

While preferred embodiments have been disclosed herein, many modifications thereof are feasible. This invention should not be restricted except insofar as is necessitated by the spirit of the prior art.

I claim:

1. Apparatus for measuring the quantity of a component in a concentrator, said concentrator including a tube composed of electrically-conducting material having therein an adsorption medium for selectively adsorbing said component from a fluid passing through said medium, said component remaining adsorbed in said medium so long as the temperature of said medium is below a predetermined magnitude and being desorbed when the temperature of said medium is at least at said predetermined magnitude, the said apparatus including: component measuring means, means for connecting said concentrator to said measuring means so that said component, when desorbed from said medium, flows into said measuring means, electrical means, to be connected to said tube, for conducting current of the order of hundreds of amperes through said tube, for supplying a large quantity of heat to said medium in a short time interval for heating said medium to a temperature at least of said predetermined magnitude in a short interval of time of the order of about 10 seconds so that said component is desorbed and transmitted through said measuring means as a pulse, and control means connected to said heating means, including temperature-responsive means, directly responsive to the temperature of said medium, for controlling the heating of said desorbing medium to terminate the supply of heat after said interval of time.

2. The apparatus of claim 1 wherein the heating means includes a transformer having a primary connected to a power supply, and a secondary connected to the tube to conduct current through said tube, the transformer having a high primary-to-secondary turns ratio so that the current of the order of several hundred amperes is conducted through said tube and said tube is heated at least to the predetermined temperature in said short time interval, and the control means includes means, responsive to the temperature-responsive means, for permitting the secondary to conduct current so long as the temperature of the medium is below the predetermined temperature and to interrupt the current when the medium reaches the predetermined temperature, whereby the component flows through the measuring means as a pulse.

3. The apparatus of claim 1 wherein the electrical conductor is an additional tube of substantially the same material, wall thickness and inside diameter as the tube of the concentrator.

4. The apparatus of claim 3 wherein the temperature responsive means includes a thermocouple whose hot junction is substantially in point contact with the additional tube and whose wires diverge from said point contact at said hot junction.

5. The apparatus of claim 1 wherein the temperature-responsive means includes a thermocouple whose hot junction is connected to an electrical conductor which is substantially at the temperature of the medium, said hot junction being substantially in point contact with said conductor and the wires of said thermocouple diverging from said hot junction.

6. The apparatus of claim 3 wherein the temperature-responsive means includes a thermocouple whose hot junction is substantially in point contact with the electrical conductor and whose wires diverge from said hot junction.

7. Apparatus for measuring the quantity of a component in a concentrator, said concentrator including a tube having therein an adsorption medium for selectively adsorbing said component from a fluid passing through said medium, said component remaining adsorbed in said medium so long as the temperature of said medium is below a predetermined magnitude and being desorbed when the temperature of said medium is at least at said predetermined magnitude, the said apparatus including: component measuring means, means for connecting said concentrator to said measuring means to transmit said component therethrough, said concentrator and measuring means forming a junction at the region where they are connected, means, to be connected to said tube, for heating said medium to a temperature at least of said predetermined magnitude so that said component is desorbed and transmitted through said measuring means, heating means for said measuring means, and heat-transfer means, thermally connected to said heating means, for transmitting heat to said junction to heat said concentrator at said junction.

8. The apparatus of claim 7 wherein the heat-transfer means includes means for concentrating the heat at the junction on the concentrator.

9. The apparatus of claim 7 wherein the junction includes a plate of low heat conducting material, and the heat-transfer means including a tube of heat conducting material thermally connected to said heating means and abutting the plate, the concentrator being connected to conduct the component through the plate and through the tube, the plate being perforated in the region where it is abutted by said tube to suppress lateral flow of heat from said tube along said plate.

10. The apparatus of claim 7 wherein the heat-transfer means includes a tube of thermally conducting material thermally connected to said heating means, the said apparatus also including means, to be connected to the concentrator, for transmitting the component through said thermally conducting tube to be heated by said tube.

11. Apparatus for measuring the quantity of a component in a plurality of concentrators, each said concentrator including a tube having therein an adsorption medium for selectively adsorbing said component from a fluid passing through said medium, the said apparatus including component-measuring means, means for connecting said concentrators in succession, each to transmit its said component, to said measuring means, means, connected to said connecting means, for supplying a carrier gas for carrying said component through said concentrator and through said measuring means, and means connected to said measuring means and responsive to the interruption of carrier-gas flow through a concentrator last connected to said measuring means for maintaining the flow of said carrier gas through said measuring means, during the intervals between connection of said last-connected concentrator and a successive concentrator to said measuring means.

12. A concentrator for concentrating, from a fluid for measurement, a measureable quantity of a component in said fluid, the said concentrator including a generally U-shaped tube having, along its length between a point near one end and a point near the opposite end, adsorbing means for adsorbing said component from said fluid as said fluid is passed through said adsorbing means, said one end of said tube being an inlet end into which said fluid is to be injected and said opposite end being an outlet end from which the resulting fluid is to be emitted, said component to be adsorbed only along a portion of the length of said adsorbing means from said inlet end, said tube having arms of different lengths, the shorter arm including the inlet end and the longer arm the outlet end, so that the inlet end may be distinguished from the outlet end.

13. Apparatus for measuring the quantity of a component in a concentrator, said concentrator including a tube, composed of electrically conducting material, having therein an adsorption medium for selectively adsorbing said component from a fluid passing through said medium, said component remaining adsorbed in said medium so long as the temperature of said medium is below a predetermined magnitude and being desorbed when the temperature of said medium is at least at said predetermined magnitude, the said apparatus including: component measuring means, means for connecting said concentrator to said measuring means so that said component, when desorbed from said medium, flows into said measuring means, an electrical conductor having the same resistance per unit length as said tube, a transformer having a primary connected to a power supply and a secondary, said transformer having a high primary-to-secondary turns ratio so that said secondary is capable of supplying high current, means for connecting said secondary, said tube and said electrical conductor in a heating circuit in which said secondary supplies said high current to heat said electrical conductor and said tube and, through said tube, to heat said medium to a temperature at least of said predetermined magnitude so that said component is desorbed and transmitted through said measuring means, and control means, including temperature-responsive means responsive to the temperature of said electrical conductor and also including means, responsive to said temperature-responsive means, for actuating said control means to interrupt the current through said tube when said medium reaches said predetermined temperature, whereby said component flows through said measuring means as a pulse.

14. Apparatus for measuring the quantity of a component in a plurality of concentrators, each said concentrator including a tube having therein an adsorption medium for selectively adsorbing said component from a fluid passing through said medium, the said apparatus including component-measuring means, means for connecting said concentrators in succession in a first gas flow circuit, each to transmit its said components to said measuring means, means connected to said connecting means for supplying a carrier gas to said first gas-flow circuit for carrying said component through said concentrator and into said measuring means, said first gas-flow circuit having a first impedance to said carrier-gas-flow, a second gas-flow circuit connecting said carrier-gas-supplying means directly to said measuring means, said second circuit having a second impedance to said carrier-gas-flow which is high compared to said first impedance, and valve means, responsive to the interruption of carrier-gas-flow through a concentrator, for confining gas flow through said second circuit to said measuring means during the intervals between successive connections of said concentrators to said measuring means.

15. The method of measuring with an instrument the quantity of a component in a fluid, said instrument producing an observable response only when said quantity exceeds a predetermined level, the said measurement being made with a concentrator having a tube including means for selectively adsorbing the said component from said fluid and from which the said component can be desorbed at a predetermined temperature, the said adsorbing means being disposed along the length of said tube from a position near one end to a position near the opposite end of said tube, the said method comprising removing the concentrator from the instrument, conducting a large quantity of said fluid through said concentrator, while said concentrator is maintained at a temperature substantially below said predetermined temperature to concentrate said component in said concentrator, the said fluid being injected in said one end of said tube and the component being adsorbed in said adsorbing means progressively along the length of said adsorbing means, from said one end, and the resulting fluid being emitted from said opposite end of said adsorbing means, there being sufficient adsorbing means along the length of said tube to adsorb said component at least up to said level without the emitted resulting fluid containing any substantial quantity of said component, connecting said concentrator to said instrument so that said component when desorbed from said adsorbing means flows into said instrument, said concentrator being connected with said one end, through which the fluid was injected, remote from said instrument and said opposite end nearest said instrument, and heating said concentrator at least to said predetermined temperature to desorb said component from said desorbing means and pass said desorbed component to said instrument, said instruments measuring the quantity of said component.

16. Apparatus for measuring the quantity of a component in a concentrator, said concentrator including a tube, composed of electrically conducting material, having therein an adsorption medium for selectively adsorbing said component from a fluid passing through said medium, said component remaining adsorbed in said medium so long as the temperature of said medium is below a predetermined magnitude and being desorbed when the temperature of said medium is at least at said predetermined magnitude, the said apparatus including: component measuring means, means for connecting said concentrator to said measuring means so that said component, when desorbed from said medium, flows into said measuring means, an electrical conductor having the same resistance per unit length as said tube, power supply means capable of supplying high current, means for connecting said power-supply means, said tube and said electrical conductor in a heating circuit in which said power supply means supplies said high current to heat said electrical conductor and said tube and, through said tube, to heat said medium to a temperature at least of said predetermined magnitude so that said component is desorbed and transmitted through said measuring means, and control means, including temperature-responsive means responsive to the temperature of said electrical conductor and also including means, responsive to said temperature-responsive means, for actuating said control means to interrupt the current through said tube when said medium reaches said predetermined temperature, whereby said component flows through said measuring means as a pulse.

* * * * *